United States Patent [19]

Jurrius et al.

[11] Patent Number: 5,728,255
[45] Date of Patent: Mar. 17, 1998

[54] APPARATUS FOR MANUFACTURING A FULL-FASHIONED GLOVE

[75] Inventors: Eran J. P. Jurrius; Robert L. Karam, Jr.; James E. Jurrius, all of Akron, Ohio

[73] Assignee: Enclosure Technologies, Inc., Akron, Ohio

[21] Appl. No.: 659,703

[22] Filed: Jun. 10, 1996

[51] Int. Cl.$^6$ ................................................. B32B 31/18
[52] U.S. Cl. ......................... 156/367; 156/500; 156/510; 156/581
[58] Field of Search .......................... 156/290, 292, 156/308.4, 324, 358, 359, 381, 581, 582, 583.4, 256, 245, 267, 382, 500, 367, 510; 2/159, 161.7, 163

[56] References Cited

U.S. PATENT DOCUMENTS

| | | | |
|---|---|---|---|
| 3,198,685 | 8/1965 | Kopito et al. | 156/251 |
| 4,168,545 | 9/1979 | Kupperman et al. | 156/290 |
| 4,643,791 | 2/1987 | Jurrius et al. | 156/251 |

*Primary Examiner*—Richard Crispino
*Attorney, Agent, or Firm*—Renner, Kenner, Greive, Bobak, Taylor & Weber

[57] ABSTRACT

An apparatus and related method for manufacturing a full-fashioned glove from similar or dissimilar polymeric material includes a controller that actuates various components in the apparatus, a thumb mold that forms a thumb portion from two layers of a first material and a hand mold which forms a plurality of fingers and a cuff from the first material and a second material. Both the thumb mold and hand mold have appropriate cavities with apertures therethrough wherein a vacuum source, actuated by the controller, draws the appropriate material toward the surface of the mold prior to closure thereof. Upon closure of the molds, a fusing element is energized by the controller and the materials are fused to one another to form the appropriate portion of the full-fashioned glove. After the glove is removed from the remaining materials, it can be employed in various types of manufacturing industries. By employing a vacuum within the molds a full fashioned glove is manufactured which presents improved sensitivity in the finger areas and which enhances the productivity of persons using the full-fashioned glove. In another embodiment, both the thumb mold and hand mold employ a male-female configuration wherein a male form pushes the appropriate materials into a female cavity so that a fully contoured shape is attained for the full-fashioned glove. The molds may include a cooling tube and the thermal form elements, which are both connected to the controller, to further assist the seam fusing process.

8 Claims, 5 Drawing Sheets

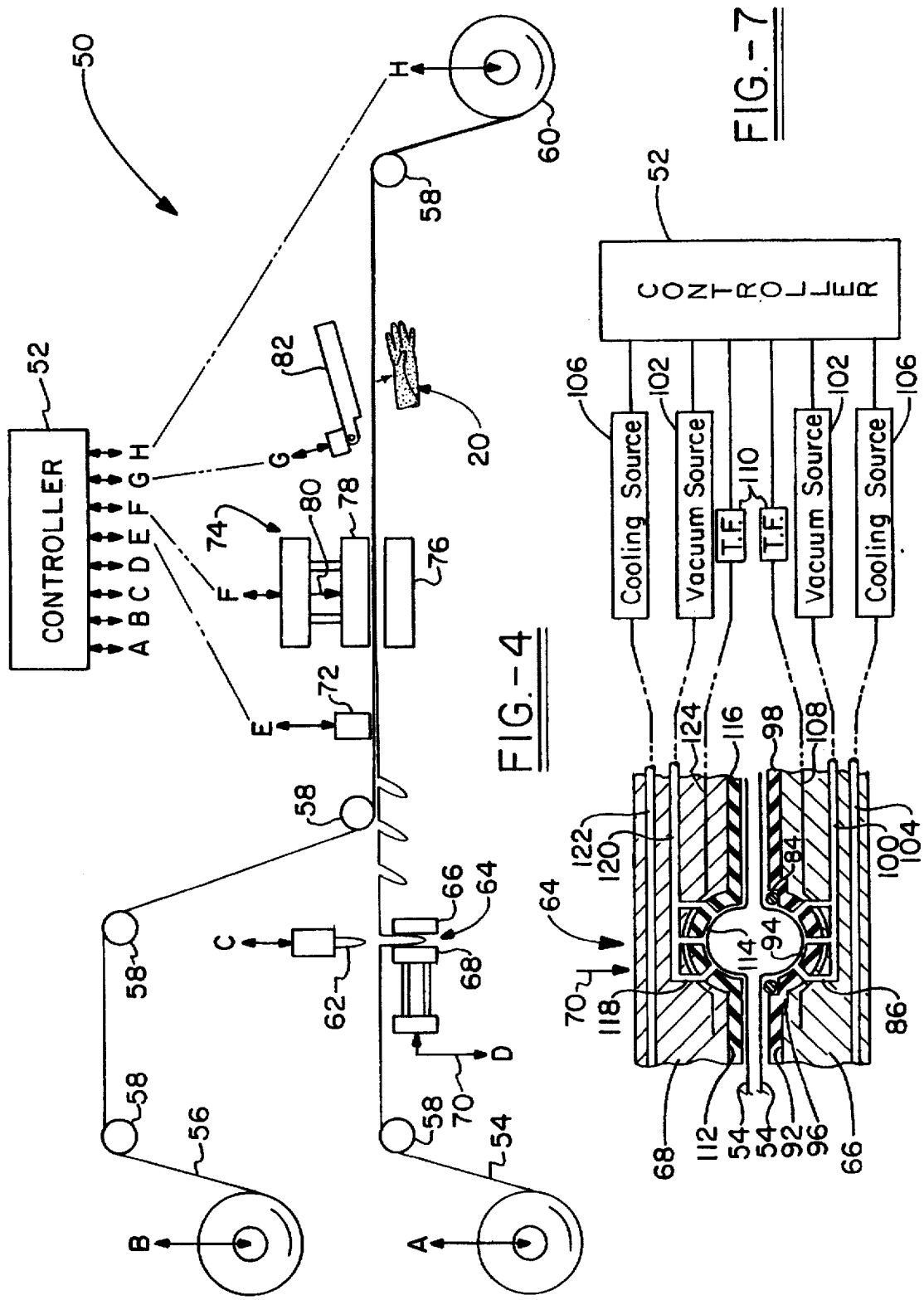

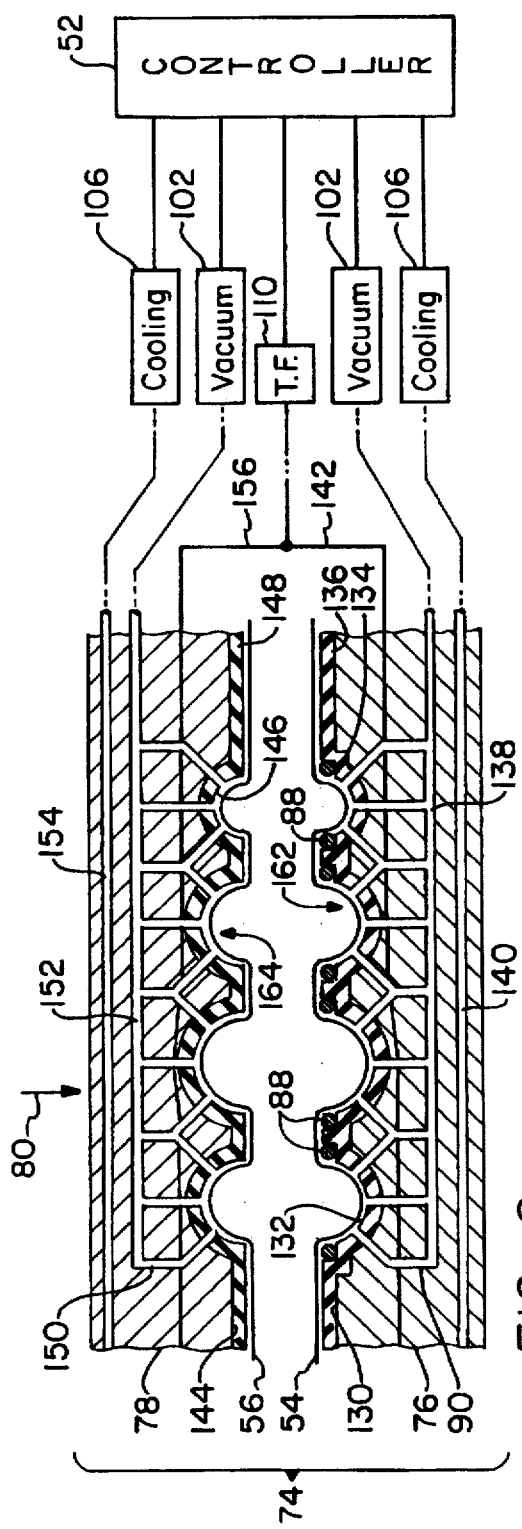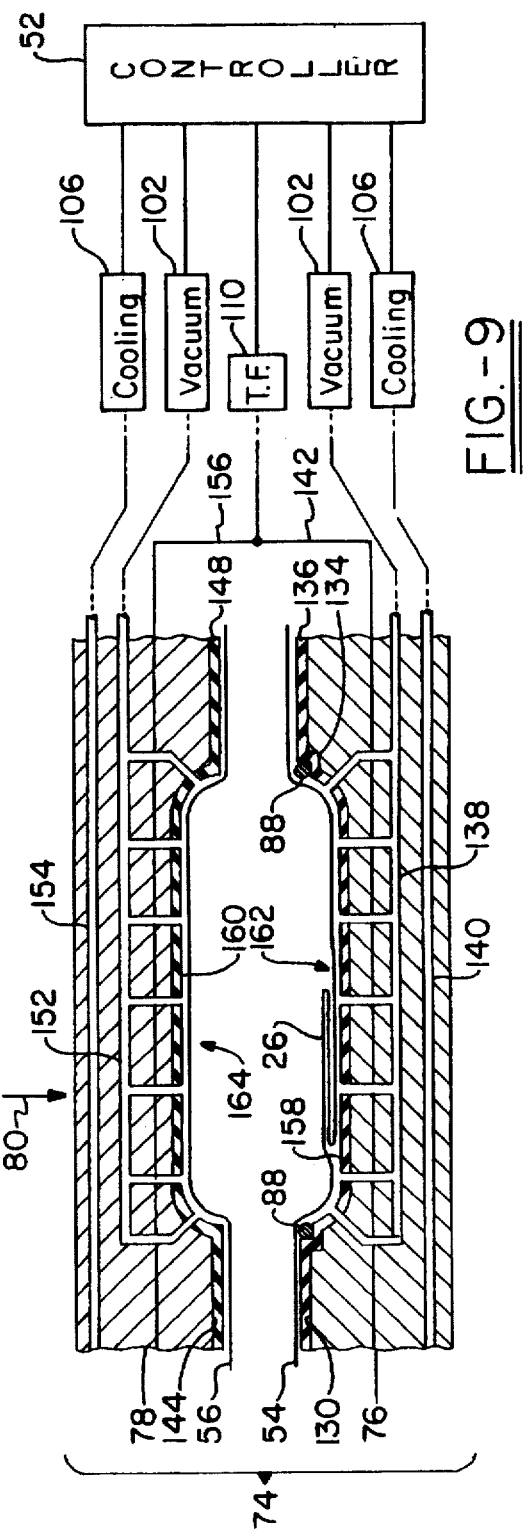

APPARATUS FOR MANUFACTURING A FULL-FASHIONED GLOVE

TECHNICAL FIELD

The invention herein resides generally in the art of glove manufacturing machines and related methods for manufacturing gloves. More particularly, the present invention relates to an apparatus and method for manufacturing a full-fashioned glove. Specifically, the present invention relates to an apparatus and method for manufacturing a full-fashioned glove that conforms to the contours of an individual's thumb, fingers and hand.

BACKGROUND ART

In manufacturing or other industries, workers may be required to handle caustic materials or other materials that irritate the skin. Some industries, such as in the manufacture of semiconductors, require that the workers wear complete body suits to prevent contamination of the manufacturing process. These workers also wear gloves made from the appropriate polymeric materials to protect their skin and the manufactured item.

Currently, gloves used in the manufacturing and pharmaceutical industries are made from polymeric materials by several methods. One method is to dip a glove form or mandrel in a dispersion of the polymeric material to form a thin film which is later removed from the form or mandrel. Another method is to sew precut patterns of polymeric material to one another. Still another method is to heat seal sheets of polymeric material to one another.

Although the aforementioned methods of manufacturing gloves achieve their stated purpose, each has limitations which reduce the effectiveness of the glove. It will be appreciated that the dipping method is limited to particular materials that can withstand the process of melting, reforming on the mandrel and removal from the mandrel. It is well known that this process is conducive to forming pinholes which permit the migration of caustic materials to the interior of the glove and contaminants to the exterior of the glove. Likewise, sewing precut patterns of the polymeric material create pinholes which cause the aforementioned problems. It is also well known that heat sealing polymeric sheets of material may produce unacceptably weak joints which are likely to tear during use. One attempt at overcoming these deficiencies is found in U.S. Pat. No. 4,643, 791, entitled "Manufacture of Gloves and the Like." This patent describes a thermobonding process which allows the use of micro-porous thermoplastic materials to manufacture gloves. Although this process overcomes some of the aforementioned limitations, there are still particular drawbacks associated therewith. In particular, a glove manufactured by the above process provides an uncomfortable and nonconforming fit. As seen in FIG. 2, a finger received within a glove manufactured by such a process provides large gaps on either side of the finger where the two sheets of material are bonded. This "slop" or loose fit provides an uncomfortable feeling to the person using the glove and contributes to a loss of dexterity and touch sensitivity when using the glove. Additionally, a glove manufactured by such a process presents an inefficient use of material.

Based upon the foregoing, it is evident that there is a need in the art for a method and apparatus for manufacturing a full-fashioned glove that matches the contour and shape of a human hand. Furthermore, there is a need for such an apparatus and method that easily manufactures such a full-fashioned glove and that is adaptable for use with any type of polymeric material.

DISCLOSURE OF INVENTION

In light of the foregoing, it is a first aspect of the present invention to provide a method and apparatus for manufacturing a full-fashioned glove.

Still another aspect of the present invention is to provide a method and apparatus for manufacturing a full-fashioned glove, wherein a first material is employed to form a glove thumb that matches the contour and shape of a human thumb.

Another aspect of the present invention is to provide a method and apparatus for manufacturing a full-fashioned glove, as set forth above, wherein a second material is fused to the first material, and wherein the first material is employed to cover the palm and fingers of a human hand and the second material is employed to cover the back of the hand.

Yet a further aspect of the present invention is to provide a method and apparatus for manufacturing a full-fashioned glove, as set forth above, which includes molds having opposed platens with cavities, wherein each cavity receives the materials and forms a portion of the glove that matches the shape and contour of that portion of the hind received therein, or in the alternative, wherein one of the opposed platens has a cavity and the other opposed platen has a mating rib that receive the materials and form a portion of the glove that matches the shape and contour of that portion of the hand received therein.

An additional aspect of the present invention is to provide a method and apparatus for manufacturing a full-fashioned glove, as set forth above, which includes a vacuum system connected to the molds that assists in pulling the materials into the opposed cavities.

Still a further aspect of the present invention is to provide a method and apparatus for manufacturing a full-fashioned glove, as set forth above, which includes thermal forming elements that draw the polymeric materials to the surface of the opposed platens.

Yet another aspect of the present invention is to provide a method and apparatus for manufacturing a full-fashioned glove, as set forth above, which includes a wire element in the molds that electronically seam fuses the polymeric materials.

Still another aspect of the present invention is to provide a method and apparatus for manufacturing a full-fashioned glove, as set forth above, which includes a cooling system within the molds to assist in the seam fusing process.

Still yet another aspect of the present invention is to provide a method and apparatus for manufacturing a full-fashioned glove, as set forth above, which includes a processor that controls the various components contained within molds.

The foregoing and other aspects of the invention which shall become apparent as the detailed description proceeds are achieved by an apparatus for manufacturing a full-fashioned glove, comprising: a thumb mold having a pair of opposed platens receiving a first material folded into two layers, the thumb mold forming a thumb-cuff portion and a thumb-finger portion with a thumb defined therebetween, the thumb mold having a thumb cavity to form the thumb; a hand mold having a pair of opposed platens receiving the thumb-cuff portion and the thumb-finger portion and a second material, the hand mold having a hand cavity to form a plurality of fingers and a cuff, wherein the thumb, the cuff and the plurality of fingers form define a full-fashioned glove; means for removing the full-fashioned glove from the first and second materials; and means for controlling the operation of the thumb mold, the hand mold and the removing means.

Other aspects of the invention are attained by a method for manufacturing a full-fashioned glove comprising the steps of: forming a thumb from opposed layers of a first material, the thumb matching the contour of a person's thumb; and forming a plurality of fingers and a cuff from the first material and a second material, the plurality of fingers matching the contour of a person's fingers and the cuff matching the contour of a person's palm and wrist, the plurality of fingers, the thumb and the cuff defining a full-fashioned glove.

Still other aspects of the invention are attained by a method for manufacturing a full-fashioned glove comprising the steps of: providing a first material and a second material; folding said first material into two opposed layers and inserting the two opposed layers into a thumb mold, said thumb mold having a thumb cavity; closing and opening said thumb mold to form a thumb from the two opposed layers, said thumb matching the contour of a person's thumb; placing said thumb in juxtaposition to said second material; inserting said thumb and said second material into a hand mold, said hand mold having a hand cavity; closing and opening said hand mold to form a plurality of fingers and a cuff, said plurality of fingers matching the contour of a person's fingers and said cuff matching the contour of a person's palm and wrist, wherein said plurality of fingers, said thumb and said cuff define a full-fashioned glove.

BRIEF DESCRIPTION OF THE DRAWINGS

For a complete understanding of the objects, techniques and structure of the invention, reference should be made to the following detailed description and accompanying drawings wherein:

FIG. 4 is a schematic drawing of an apparatus employed to manufacture a full-fashioned glove;

FIG. 7 is a schematic and partial cross-section of a thumb mold;

FIG. 8 is a schematic and partial cross-section of a finger portion of a hand mold;

FIG. 9 is a schematic and partial cross-section of a palm portion of the hand mold;

BEST MODE FOR CARRYING OUT THE INVENTION

Figure 1:
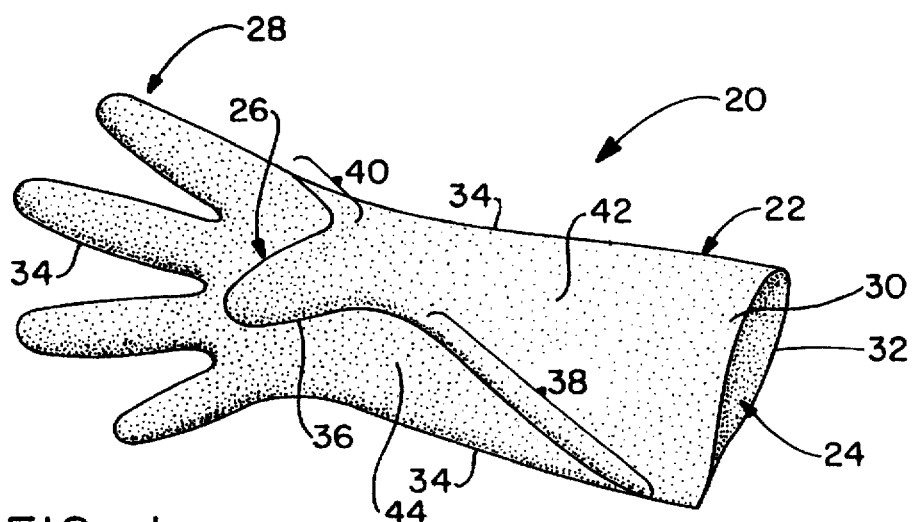
FIG. 1 is a perspective view of a full-fashioned glove according to the present invention.

Referring now to the drawings and more particularly to FIG. 1, it can be seen that a full-fashioned glove manufactured according to the present invention is designated generally by the numeral 20. The full-fashioned glove 20 includes a cuff 22 that has an opening 24, a thumb 26 and a plurality of fingers 28. Although a right handed full-fashioned glove is presented in FIG. 1, it will be appreciated that the present invention is equally applicable to the manufacture of left handed gloves and any other similar covering or enclosure that requires the covering to conform to the contours of a receiving article. As is well known, a person inserts their hand into the opening 24 and extends their thumb and fingers into the appropriate receiving portions of the full-fashioned glove. It will be appreciated that the angular disposition of the thumb 26 and fingers 28 with respect to the cuff 22 are such that the full-fashioned glove 20 snugly fits around the hand of the person using the glove.

The full-fashioned glove 20 is manufactured from two sheets of similar or dissimilar polymeric materials, wherein each sheet could be a singular polymeric material or consist of multiple layers of dissimilar polymeric materials. In any event, the full-fashioned glove 20 includes an anterior or front sheet 30, which covers a person's thumb and palm, and a posterior or back sheet 32 which is fused to the anterior sheet 30 to cover the back of the person's hand. It will be appreciated that the anterior sheet 30 and the posterior sheet 32 are selected for their various physical properties including but not limited to, chemical resistance, the touch and feel of the glove, and the strength and adaptability of the materials for manufacture of the glove.

Generally, the full-fashioned glove 20 is manufactured by seam fusing the sheets 30 and 32 to one another to obtain the desired shape and contour of the receiving article. A hand seam line 34 interconnects the anterior sheet 30 to the posterior sheet 32 and extends from one edge of the cuff 22 through the plurality of fingers 28 and returns to the opposite edge of the cuff 22. A thumb seam line 36 interconnects two folded layers of the anterior sheet 30 to form the thumb 26. The thumb seam line 36 extends from the hand seam line 34 just below the forefinger portion of the glove 20 and extends downwardly toward the hand seam line at the opposite edge of the glove near the cuff 22. It will be appreciated that the thumb seam line 36 includes a cuff seam 38 which extends from the hand seam line 34 just above the opening 24 to the thumb 26 and wherein an index seam 40 extends from the thumb 26 to the hand seam line 34 just below the forefinger portion of the glove 20. Accordingly, a thumb-cuff portion 42 is formed from the anterior sheet 30 and is defined by the thumb seam line 36, opposed portions of the hand seam line 34 and the opening 24. Likewise, a thumb-finger portion 44 is also formed from the anterior sheet 30 and is defined by the thumb seam line 36, a continuous portion of the hand seam line 34 and the plurality of fingers 28.

The hand seam line 34 and thumb seam line 36 presented by the full-fashioned glove 20 may be made in accordance with the method and apparatus disclosed in U.S. Pat. No. 5,472,549, by Eran J. P. Jurrius and Robert L. Karam, and entitled "Apparatus for Electronically Seam Fusing Similar and Dissimilar Polymeric Materials," which is incorporated herein by reference.

Figure 2:
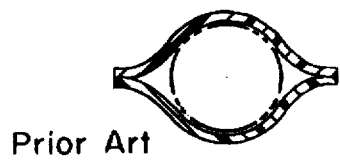
FIG. 2 is a cross-section of a glove finger manufactured according to the prior art.
Figure 3:
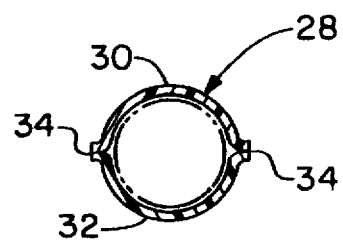
FIG. 3 is a cross-section of a glove finger manufactured according to the present invention.

As discussed previously in the Background Art section, FIG. 2 presents a cross-section of a prior art glove that employs "cookie-cutter" manufacturing techniques. In other words, the cookie-cutter process creates a glove with a wide gap between the body part and the enclosure material. This gap or interstice reduces the amount of feel or sensitivity of touch that is preferred by those wearing gloves in manufacturing industries. In distinct contrast, FIG. 3 presents an exemplary cross section of a finger 28 from the full-fashioned glove 20. As can be seen, the full-fashioned glove 20 significantly reduces any gap between a person's finger and the material used to manufacture the glove.

Referring now FIG. 4, it can be seen that an apparatus for manufacturing a full-fashioned glove 20 is designated generally by the numeral 50. In this embodiment, the apparatus 50 is only configured to manufacture one full-fashioned glove at a time. However, the apparatus 50 could be configured to manufacture any number of gloves simultaneously. The apparatus, 50 includes a controller 52 which has a processor with the necessary hardware, software and memory to control the various operational features of the apparatus 50. Connections between various components of the apparatus 50 and the controller 52 are represented by letter designations. For example, the apparatus 50 receives a web 54 that is provided in roll form, wherein the rotation of the roll is monitored and controlled by the controller 52 by virtue of the connection designated by the letter A. The web 54 is employed as the anterior sheet 30 which forms the thumb 26 and that portion of the cuff 22 and fingers 28 which cover the front of a person's hand. In a similar manner, a web 56 is received by the apparatus 50, wherein the web 56 is employed as the posterior sheet 32 which forms the cuff 22 and fingers 28 that cover the back of a person's hand. The web 56 is also provided in roll form with its rotation monitored and controlled by the controller 52. A plurality of tension rollers 58 are provided throughout the apparatus 50 to assist in the delivery of the webs 54 and 56 to the appropriate station within the apparatus 50. A take-up roll 60 is employed to pull the webs 54 and 56 through the apparatus 50 and wherein the rotational movement of the roll 60 is monitored by the controller 52. Other means may be employed to move the webs 54 and 56 through the apparatus 50. For example, sprockets may engage holes provided within the webs 54 and 56 and wherein the movement of the sprockets is monitored by the controller 52.

A push rod 62, which is connected to and monitored by the controller 52, folds the web 54 into two layers that are pushed into a thumb mold 64. As will be described in detail hereinbelow, the thumb mold 64 forms the thumb seam line 36 while forming the thumb 26 which conforms to the contours of a person's thumb. The thumb mold 64 includes opposed platens 66 and 68 which receive the folded layers of the web 54. A closure force 70, which is also controlled by the controller 52, forces the platens 66 and 68 together to form the thumb 26. It will be appreciated that the push rod 62 does not interfere with the closure of the platens 66 and 68. Ideally, the push rod 62 engages the lateral edges of the web 54 and holds the web 54 taut as the opposed platens 66 and 68 close. During formation of the thumb 26, rotation of the take-up roll 60 and the roll 54 is controlled to allow the proper formation of the thumb 26.

After completion of the thumb molding process, the thumb mold 64 is opened and the take-up roll 60 is rotated to pull webs 54 and 56 past a sensor 72 which is connected to the controller 52. The sensor 72 confirms the position of both webs 54 and 56 as they proceed through the apparatus 50. One type of sensor could employ a laser light to detect the presence and position of the thumb seam line 36. Another type of sensor could employ a sprocket wheel that engages holes provided in each web at the thumb molding operation to align the thumb 26 where needed in the remaining operations. Of course, other types of sensors could be employed to properly position the thumb in the remaining operations.

A hand mold 74, which is connected to the controller 52, receives both webs 54 and 56 to form the plurality of fingers 28 and the cuff 22. The hand mold 74 includes opposed platens 76 and 78 which are acted upon by a closure force 80 monitored by the controller 52. It will be appreciated that the hand mold 74 is properly oriented to receive the thumb seam line 36 between the platens 76 and 78. In other words, as the web 54 is pulled into the hand mold 74, the thumb 26 does not interfere with the formation of the hand seam line 34. After formation of the hand seam line 34, the hand mold 74 is opened and webs 54 and 56 are pulled by the take-up roll 60 to a knife 82 which is operatively controlled by the controller 52. The controller 52 stops the movement of the webs 54 and 56 and engages the knife 82 to remove the full-fashioned glove 20 from both webs 54 and 56. Accordingly, the full-fashioned glove 20 is then transferred to the appropriate work stations and the remaining material of webs 54 and 56 are pulled onto the roll 60 and recycled. Of course, other means may be employed to remove the full-fashioned glove 20 from the webs 54 and 56.

Figure 5:
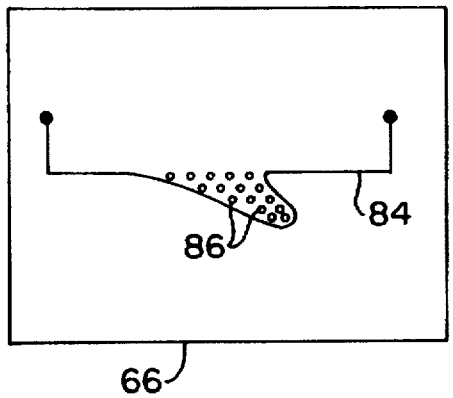
FIG. 5 is a top view of a thumb mold platen.
Figure 6:
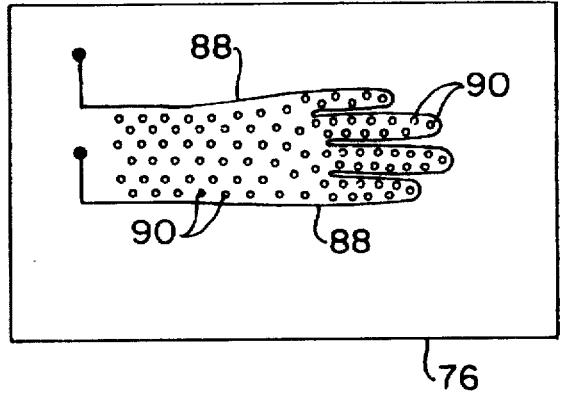
FIG. 6 is a top view of a hand mold platen.

Referring now to FIGS. 5 and 6, the orientation of fusing elements employed to form the thumb seam line 36 and the hand seam line 34 are presented. In particular, FIG. 5 presents the platen 66 which includes a fusing element 84 that is generally thumb shaped. The thumb fusing element 84, which is actuated by the controller 52, functions to seam fuse the two layers of the anterior sheet 30 to form the thumb 26. The platen 66 includes a plurality of vacuum apertures 86 which are employed to hold the anterior sheet 30 in place as the fusing operation is conducted. In the preferred embodiment, the vacuum apertures 86 have a diameter of about 0.001 inch to about 0.003 inches and are spaced according to the specific properties of the material being fused. In a similar manner, the platen 76 presents a fusing element 88 which forms the plurality of the fingers 28 and in particular the hand seam line 34. As with the fusing element 84, the fusing element 88 is actuated by the controller 52. The platen 76 also includes a plurality of vacuum apertures 90 which have the same spacing and diameter considerations as in the platen 66.

Referring now to FIGS. 7–12, two embodiments of the thumb mold and hand mold are presented. Generally, the first embodiment employs platens with opposed cavities connected to a vacuum system that holds the webs 54 and 56 in the opposed cavities as the fusing elements fuse the webs 54 and 56 to one another. The second embodiment employs mating male-female platens to form and hold the materials in place as the fusing elements fuse the materials to one another. Both of these embodiments employ molds that form contours in the full-fashioned glove 20 which match the contour of the body part received therein. This is accomplished by actively deforming the layer of material adjacent each platen of the thumb mold and the hand mold. In other words, each layer of material, which forms about one-half of the appropriate glove portion, is deformed to conform to that portion of the body part adjacent thereto when received in the glove 20.

In the first preferred embodiment, the thumb mold 64 shown in FIG. 7 includes the opposed platens 66 and 68 which mate with one another when the closure force 70 is applied. Both platens 66 and 68 are typically made of a metal material that can withstand repeated openings and closings. The platen 66 includes a flat surface 92 from which inwardly extends a thumb cavity 94. Defined between the flat surface 92 and the thumb cavity 94 are notches 96. A sealing layer 98, which is a non-electrically conductive material, is disposed on the flat surface 92, in the thumb cavity 94 and in the notches 96. The notches 96 receive the fusing element 84 which forms the thumb seam line 36. Since the fusing element 84 is electrically conductive, it is required that the sealing layer 98 be non-conductive to ensure the fusing of the two layers of the anterior sheet 30 to one another. It will further be appreciated that the fusing element 84 is a single continuous length of wire that is selected for its fusing properties with respect to the materials employed in the manufacture of the full-fashioned glove 20. All of the plurality of vacuum apertures 86 extend through the sealing layer 98 and the platen 66 into a main duct 100 which is connected to a vacuum source 102. The controller 52 monitors the vacuum source 102 which pulls the facing layer of the web 54 into the thumb cavity 94 during closure of the platens 66 and 68. A cooling tube 104 is received within the platen 66 and is connected to a cooling source 106 that is controlled by the controller 52. Those skilled in the art will appreciate that the cooling tube 104 carries refrigerant or other cooling solutions to assist in the fusing process. A thermal form element 108 is also received in the platen 66 and is connected to a thermal form source 110. The controller 52 controls the operation of the thermal form source 110 and the thermal form element 108 to further assist the drawing of one layer of the material 54 into the thumb cavity 94.

In a similar manner, the platen 68 includes a flat surface 112 from which a thumb cavity 114 extends. A sealing layer 116, which is a non-conductive material that allows for the operation of the fusing element 84, is disposed over the flat surface 112 and in the thumb cavity 114. Although not shown, it will be appreciated that a fusing element, with the appropriate electrical isolation from the platen 68, may be included on the sealing layer 116 to further assist in the fusing process. Extending from the thumb cavity 114 through the sealing layer 116 and the platen 68 are a plurality of vacuum apertures 118 that are connected to a main duct 120 which is connected to the vacuum source 102. The platen 68 also includes a cooling tube 122 connected to the cooling source 106 and a thermal form element 124 connected to the thermal form source 110.

Referring now to FIGS. 8 and 9, the structure of the platens 76 and 78 is presented. The platen 76 includes a flat surface 130 from which inwardly extends a plurality of finger cavities 132. Defined between the flat surface 130 and the finger cavities 132 are notches 134. A sealing layer 136 is disposed on the flat surface 130, the finger cavities 132 and the notches 134. The plurality of vacuum apertures 90 extend through the platen 76 and the sealing layer 136 into the cavities 132 and are connected to a main duct 138 which is connected to the vacuum source 102. A cooling tube 140 is received within the platen 76 and is connected to the cooling source 106. Likewise, a thermal form element 142 is received within the platen 76 and is connected to the thermal form source 110.

The platen 78 includes a flat surface 144 from which extends inwardly a plurality of finger cavities 146 that oppose the finger cavities 132. A sealing layer 148 is disposed on the flat surface 144 and in the finger cavities 146. A plurality of vacuum apertures 150 extend through the flat surface 144, the sealing layer 148 and into the cavities 146. The platen 78 has a main duct 152 that interconnects the vacuum apertures 150 to the vacuum source 102. A cooling tube 154 is received with the platen 78 and is connected to the cooling source 106. A thermal form element 156 is received within the platen 78 and is connected to the thermal form source 110.

FIG. 9 presents a cross-sectional view of the platens 76 and 78 which form the cuff 22. The platen 76 includes an inwardly extending palm cavity 158 that is continuous with the finger cavities 132. Likewise, the platen 78 includes an inwardly extending palm cavity 160 that is continuous with the finger cavities 146. It will be appreciated that the finger cavities 132 and the palm cavity 158 form a hand cavity 162 in the platen 76. Likewise, the finger cavities 146 and the palm cavity 160 form a hand cavity 164 that opposes the hand cavity 162. It will further be appreciated that the notches 134 are also disposed between the palm cavity 158 and the flat surface 138 and that the fusing element 88 is received in the notches 134.

Figure 10:
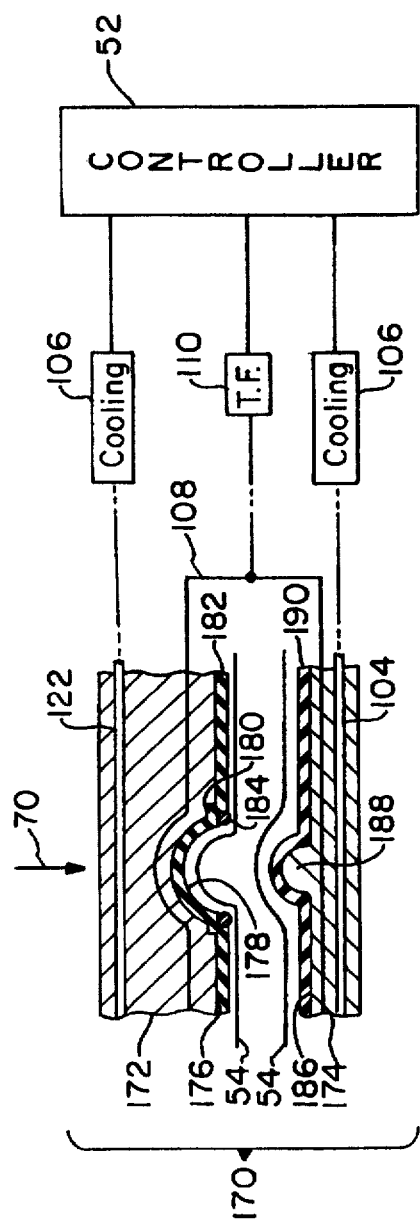
FIG. 10 is a schematic and partial cross-section of an alternative embodiment of a thumb mold.
Figure 11:
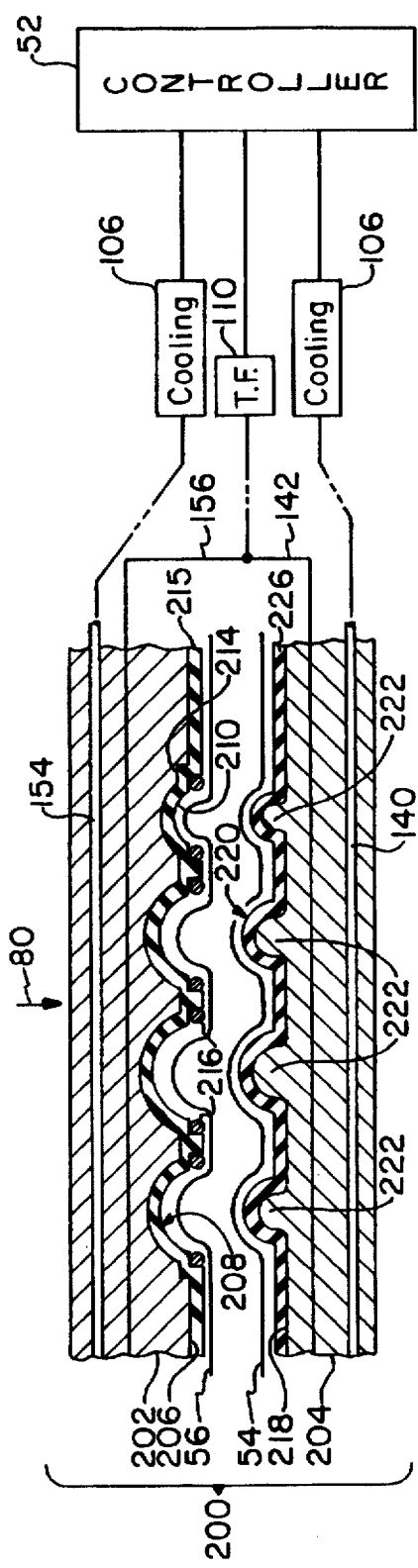
FIG. 11 is a schematic and partial cross-section of an alternative embodiment of a finger portion of a hand mold.
Figure 12:
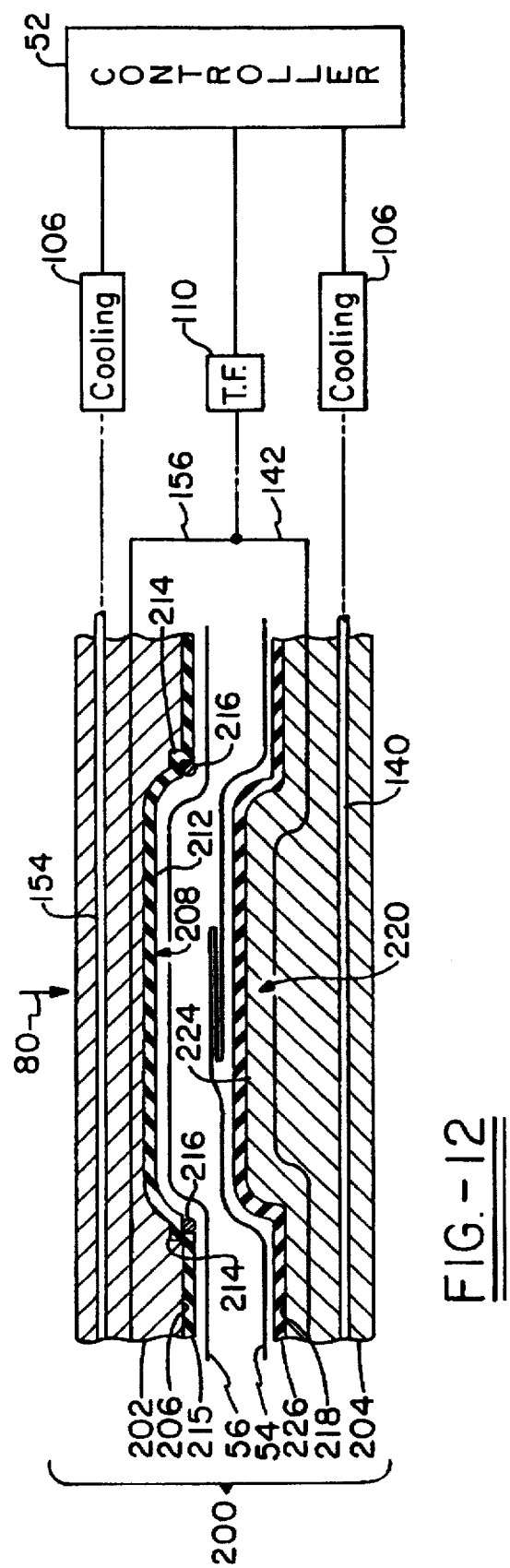
FIG. 12 is a schematic and partial cross-section of an alternative embodiment of a palm portion of the hand mold.

In the second preferred embodiment shown in FIGS. 10–12, a thumb mold 170 includes a pair of opposed platens 172 and 174 which mate with one another when the closure force 70 is applied. Both platens 172 and 174 are typically made of a metal material that can withstand repeated openings and closings. The platen 172 includes a flat surface 176 from which inwardly extends a thumb cavity 178. Defined between the flat surface 176 and the thumb cavity 178 are notches 180. A sealing layer 182, which is a non-electrically conductive material, is disposed on the flat surface 176, in the thumb cavity 178 and in the notches 180. The notches 180 receive a fusing element 184 which forms the thumb seam line 36. Since the fusing element 184 is electrically conductive, it is required that the sealing layer 182 be non-conductive to ensure the fusing of the two layers of the anterior sheet 30 to one another. It will further be appreciated that the fusing element 184 is a single continuous length of wire that is selected for its fusing properties with respect to the materials employed in the manufacture of the full-fashioned glove 20. The cooling tube 122 is received within the platen 172 and is connected to the cooling source 106 that is controlled by the controller 52. Likewise, the thermal form element 108 is also received in the platen 172 and is connected to the thermal form source 110. The controller 52 controls the operation of the thermal form source 110 wherein the thermal form element 108 is employed to further assist the drawing of the material 54 into the thumb cavity 178.

The platen 174 includes a flat surface 186 from which a thumb form or rib 188 extends. A sealing layer 190 is disposed over the flat surface 186 and the thumb rib 188 and as discussed in the structure of the platen 172 is a non-electrically conductive material that allows for the operation of the fusing element 184. Although not shown, it will be appreciated that a fusing element could also be included on the sealing layer 190 to assist in the fusing process. The platen 174 also includes the cooling tube 104 connected to a cooling source 106 and a thermal form element 124 connected to a thermal form source 110. When the platens 172 and 174 are closed, the thumb rib 188 is received within the thumb cavity 178 with the folded layers of web 54 received therebetween.

Referring now to FIGS. 11 and 12, the structure of a hand mold 200 which includes a pair of opposed platens 202 and 204 is presented. In much the same manner as the previous platens, the platen 202 includes a flat surface 206 from which inwardly extends a hand cavity 208 that includes a plurality of finger cavities 210 that are continuous with a palm cavity 212. Defined between the flat surface 206 and the hand cavity 208 is a notch 214. A sealing layer 215 is disposed on the flat surface 206, the hand cavity 208 and the notch 214. A fusing element 216 is received in the notch 214. The top platen 202 includes the cooling tube 154 that is connected to the cooling source 106. Likewise, a thermal form element 156 is received within the platen 202 and is connected to the thermal form source 110. The bottom platen 204 includes the cooling tube 140 that is connected to the cooling source 106 and the thermal forming element 156 that is connected to the thermal form source 110.

The platen 204 includes a flat surface 218 from which extends a hand form 220 that includes a plurality of finger ribs 222 and a palm rib 224. A sealing layer 226 is disposed on the flat surface 218 and the hand form 220. When the platens 202 and 204 are closed, the hand form 220 is received within the hand cavity 208 with the webs 54 and 56 received therebetween.

Referring now to FIGS. 4–9, the operation of the first preferred embodiment will be presented. As mentioned previously, the controller 52 controls all of the operational aspects of the apparatus 50 including, but no limited to, the push-rod 62, the thumb mold 64, the sensor 72, the hand mold 74, the cutting knife 82 and the rotation of the material rolls that carry the webs 54 and 56 and the take-up roll 60. First, the controller 52 controls the rotation of the take-up roll 60 and the roll containing the web 54. At this time, the controller 52 stops the movement of the web 54 and instructs the push rod 62 to form two opposed layers of the anterior sheet 30 within the thumb mold 64. As the push rod 62 holds the web 54 taut, the controller 52 instructs the closure force 70 to close the platens 66 and 68 onto the anterior sheet 30. Slightly before or after closure of the thumb mold 64, the vacuum source 102 is activated and the opposed layers of web 54 are drawn into the thumb cavities 94 and 114, respectively. As the vacuum source 106 holds the two layers of web 54 in place, the controller 52 activates the fusing element 84 which electronically seam fuses the two layers of opposed material to one another and forms the thumb seam line 36. If required, the controller 52 also actuates the thermal form source 110 to assist in drawing the webs 54 into the cavities 94 and 114. Upon completion of the seam fusing, the controller 52 may actuate the cooling source 106 to assist in properly forming the bonding of the two layers to one another. After the appropriate cooling, the controller 52 instructs the closure force 70 to be released and the mold 64 opens.

The controller 52 then instructs the take-up roll 60 to rotate which effectively pulls both webs 54 and 56 past the sensor 72. As those skilled in the art will appreciate the sensor 72 monitors the positional location of the newly formed thumb 26 with respect to the web 56. Based upon the location of the thumb 26, the webs 54 and 56 are received within the hand mold 74. As those skilled in the art will appreciate, the thumb 26 is oriented so that it is within the palm cavity 158. The controller 52 stops movement of the webs 54 and 56 and applies a closure force to the mold 74. Slightly before or after closure of the mold 74, the vacuum source 106 is actuated and the opposed webs 54 and 56 are dram into the hand cavities 162 and 164. The controller 52 actuates the fusing element 88 to seam fuse the anterior sheet 30 to the posterior sheet 32 which forms the plurality of fingers 28 and the cuff 22. If required, the controller 52 also energizes the thermal form source 110 and the cooling source 106 to obtain a proper fuse between webs 54 and 56. After the hand molding cycle is completed, the controller 52 instructs the hand mold 74 to open and for the take-up roll 60 to pull the webs 54 and 56 to the cutting knife 82. Accordingly, after the controller 52 instructs the take-up roll 60 to stop, the controller 52 actuates the cutting knife 82 to separate the full-fashioned glove 20 from both webs 54 and 56.

This embodiment provides several advantages. First, the vacuum source 102 holds the webs 54 and 56 in the appropriate contoured position while the seam fusing elements 84 and 88 are actuated. By virtue of holding the anterior sheet 30 and the posterior sheet 32 in a contoured position, the formed cuff 22, thumb 26 and fingers 28 receive the appropriate body part with minimal spacing therebetween. This maximizes the sensitivity, touch and feel of the person using the full-fashioned glove. Another advantage is that various types of polymeric materials can be employed to form the full-fashioned glove 20 by using the seam fusing elements, the thermal form elements and the cooling elements.

In the second preferred embodiment, the thumb mold 64 is replaced by the thumb mold 170 and the hand mold 76 is replaced by the hand mold 200. As those skilled in the art will appreciate, the operational flow of the materials through the apparatus 50 are similar to the first embodiment. However, the operation of the molds 170 and 200 are slightly different based upon their structural differences. In particular, the thumb mold 170 employs a male-female configuration in that the thumb form 188 pushes the two layers of web 54 into the thumb cavity 178. Accordingly, the controller 52 sequences the fusing element 184 and forms the thumb 26. In a similar manner, the hand mold 200, when closed, causes the fingers 222 and palm 224 to be received by the finger cavities 210 and the palm cavity 212, whereupon the controller 52 actuates the fusing element 216 to seam fuse the webs 54 and 56 to one another.

The second preferred embodiment presents many of the same advantages of the first preferred embodiment. However, this embodiment employs a mating male form and female cavity to form the appropriate contoured portion of the glove 20. This variation may be employed where the polymeric materials are not compatible with the vacuum apertures employed in the first embodiment.

Thus it can be seen that the objects of the invention have been attained by the structure and methods presented above. While in accordance with the patent statutes, only the best mode and preferred embodiment of the invention has been presented a described in detail, the invention is not limited thereto or thereby. Accordingly, for an appreciation of the true scope and breadth of the invention, reference should be made to the following claims.

What is claimed is:

1. An apparatus for manufacturing a full-fashioned glove, comprising:

a thumb mold having a pair of platens which are opposed for receiving a first web material folded into two layers, one of said thumb mold platens having a thumb cavity for receiving the first web material and the other of said thumb mold platens having a thumb rib receivable within said thumb cavity, said thumb rib and said thumb cavity forming a thumb and a portion of a cuff;

a hand mold having a pair of platens which are opposed for receiving the first web material, the thumb and the portion of the cuff and a second web material, one of said hand mold platens having a hand cavity for receiving the first and the second web materials, the thumb and the portion of the cuff and the other of said hand mold platens having a hand form receivable within said hand cavity, said hand cavity and said hand form forming a plurality of fingers and a remaining portion of the cuff, wherein said thumb cavity, said thumb rib, said hand cavity and said hand form are shaped to form the thumb, the cuff and the plurality of fingers of the full-fashioned glove to match the contour of a user's hand received therein;

means for removing the full-fashioned glove from remaining portions of the first and second web materials; and means for controlling the operation of said thumb mold, said hand mold and said removing means.

2. The apparatus according to claim 1, further comprising a vacuum connected to said controlling means;

said thumb mold having a plurality of apertures therethrough connected to said vacuum, said vacuum pulling the two layers of the first web material into said thumb cavity; and said hand mold having a plurality of apertures therethrough connected to said vacuum, said vacuum pulling the first and second web materials into said hand cavity.

3. The apparatus according to claim 2, further comprising:

a thumb fusing element carried by said thumb mold and connected to said controlling means, said thumb fusing element fusing the two layers of the first web material to one another after said thumb mold is closed; and a hand fusing element carried by said hand mold and connected to said controlling means, said hand fusing element fusing the second web material to the first web material after said hand mold is closed.

4. The apparatus according to claim 3, wherein each said platen in said thumb mold has disposed thereon a thumb mold platen sealing layer with said plurality of apertures extending through said thumb mold platen sealing layer; and wherein each said platen in said hand mold has disposed thereon a hand mold platen sealing layer with said plurality of apertures extending through said hand mold platen sealing layer.

5. The apparatus according to claim 4, further comprising a thermal form element received in said thumb mold and said hand mold and connected to said controlling means, said thermal form elements attracting the first and second web materials to said sealing layers in said thumb mold and said hand mold.

6. The apparatus according to claim 1, further comprising:

a thumb fusing element carried by one of said opposed platens in said thumb mold, said thumb fusing element connected to said controlling means, said thumb fusing element fusing the two layers of the first web material to one another after said thumb mold is closed; and a hand fusing element carried by one of said opposed platens in said hand mold, said hand fusing element connected to said controlling means, said hand fusing element fusing the second web material to the first web material after said hand mold is closed.

7. The apparatus according to claim 6, wherein said opposed platens of said thumb mold have a sealing layer on a facing surface thereof, and wherein said opposed platens of said hand mold have a sealing layer on a facing surface thereof.

8. The apparatus according to claim 7, further comprising a thermal form element received in said thumb mold and said hand mold and connected to said controlling means, said thermal form elements attracting the first and second web materials to said sealing layers in said thumb mold and said hand mold.

* * * * *